(12) United States Patent
Sekiya

(10) Patent No.: US 6,739,727 B2
(45) Date of Patent: May 25, 2004

(54) RAMAN AMPLIFIER AND PUMPING APPARATUS, AND PROGRAM

(75) Inventor: Kayato Sekiya, Tokyo (JP)

(73) Assignee: NEC Corporation, Tokyo (JP)

(*) Notice: Subject to any disclaimer, the term of this patent is extended or adjusted under 35 U.S.C. 154(b) by 61 days.

(21) Appl. No.: 10/259,438

(22) Filed: Sep. 30, 2002

(65) Prior Publication Data

US 2003/0067669 A1 Apr. 10, 2003

(30) Foreign Application Priority Data

Oct. 9, 2001 (JP) .......................... 2001-311620

(51) Int. Cl.[7] .................................................. H01S 3/00
(52) U.S. Cl. ............................... 359/334; 359/337
(58) Field of Search ................................ 354/334, 337

(56) References Cited

U.S. PATENT DOCUMENTS 6,519,079 B1 * 2/2003 Grochocinski et al. ...... 359/337
6,614,586 B2 * 9/2003 Hayee et al. ................ 359/334

FOREIGN PATENT DOCUMENTS

JP     2000-330145      11/2000
JP     200122897 A   *   4/2002

OTHER PUBLICATIONS

H Suzuki et al., "Seamless 32x10 Gb/s transmission over 320 km of 1.55 m dispersion–shifted fiber using wavelengths ranging from 1546 nm", Optical Fiber Communication Conference and the International Conference or an Integrated Optics and Optical Fiber Communication '99 Technical Digest, Th04, pp. 221–223.

* cited by examiner

*Primary Examiner*—Mark Hellner
(74) *Attorney, Agent, or Firm*—McGinn & Gibb, PLLC

(57) ABSTRACT

When Raman amplification is performed, the occurrence of lightwaves through FWM in a wavelength band of input signal light is suppressed, thereby avoiding deterioration of the signal quality. Allocation of lightwaves of the pumping light is controlled so that, wavelengths of lightwaves arising through a nonlinear effect of pumping lights generated by a pumping means or of pumping lights and input signal light, or both, are not within the wavelength band of the input signal light.

25 Claims, 10 Drawing Sheets

RAMAN AMPLIFIER AND PUMPING APPARATUS, AND PROGRAM

BACKGROUND OF THE INVENTION

1. Field of the Invention

The present invention is used for optical communication and concerns especially, an optical amplifier used for Raman amplification.

2. Description of Related Art

In a wavelength division multiplex (WDM) optical transmission system, signal channels having a plurality of different wavelengths are simultaneously transmitted in one optical fiber. This means that in a WDM transmission system, increasing the number of wavelengths (the number of signal channels) expands the transmission capacity for each optical fiber thereby enabling greater economy in the number of optical fibers.

A WDM optical transmission system is comprised mainly of: (1) an optical transmitter installed in a transmitting terminal, (2) an optical receiver installed in a receiving terminal and (3) an optical transmission line connecting the optical transmitter and receiver. Usually, an optical transmission line is comprised of: (A) a plurality of optical amplifiers such as erbium doped optical fiber amplifiers, for amplifying WDM optical signals and (B) a plurality of transmission optical fibers connecting between the optical amplifiers.

The signal quality of signal light output from an optical transmitter deteriorates as it is transmitted through an optical transmission line. The primary factors of this deterioration are degradation through amplified spontaneous emission (ASE) and degradation due to nonlinear effects. ASE refers to a constant amount of light with random phases. Nonlinear effects include various kinds of effects, among which distortion due to self phase modulation group velocity dispersion (SPM-GVD) is the most typical one. Distortion due to SPM-GVD refers to a wave distortion caused by time-dependent nonlinear refractive index changes in the transmission fiber induced by signal light pulses. The distortion increases with the signal light power.

Signal deterioration caused by ASE has a tendency to increase as signal light power output from transmission fiber decreases. This is because the output terminal of a transmission fiber is normally connected to the input terminal of an optical amplifier which usually generates a constant amount of optical noise. Therefore, if signal power output from transmission fiber decreases, the ratio of signal power to ASE, that is to say, the signal-to-noise ratio (SNR) decreases leading to signal degradation. In other words, to reduce the effects of ASE, higher signal light power is preferable at the output of a transmission fiber.

Signal deterioration from nonlinear wave distortion caused by SPM-GVD has a tendency to increase as signal light power input into transmission fiber increases. This is because the nonlinear refractive index change that causes SPM-GVD nonlinear waveform distortion increases together with signal light power. Accordingly, to reduce the effects of nonlinear wave distortion caused by SPM-GVD, lower signal light power is preferable at the input of a transmission fiber.

Accordingly, due to these two kinds of signal deterioration, higher signal light power is preferable at the output of a transmission fiber while lower signal light power is preferable at the input of a transmission fiber. However, because the output signal light power and the input signal light power is related uniquely though the optical transmission fiber loss, both those conditions cannot be satisfied simultaneously. Therefore, signal light power is usually set to minimize the overall deterioration from the both kinds.

Even with signal light power at optimum conditions, both these deterioration cannot be completely avoided. Further, both these kinds of deterioration accumulate and worsen as signals pass through a plurality of optical amplifiers and transmission fibers. Therefore, the maximum transmission distance for an optical transmission system is usually restricted by the accumulation of deterioration through both causes.

For relaxing such restrictions, methods and systems using Raman amplification are proposed. Raman amplification refers to a phenomenon wherein amplification of signal light inside transmission fiber is achieved via the stimulated Raman effect. This occurs as pumping light, light of specific wavelengths different from the wavelengths of the signal lights, is input into the transmission fiber simultaneously with the signal light. There are three configurations for a system using Raman amplification: the "backward pumping" configuration where backward pumping light is transmitted in the opposite direction to the signal light; the "forward pumping" configuration where forward pumping light is transmitted in the same direction as the signal light; and the "bidirectional pumping" configuration where both forward pumping light and backward pumping light are transmitted in the same direction and the opposite direction to the signal light, respectively. By using Raman amplification of any of these three configurations, it is possible to achieve better signal quality than provided by a configuration not applying Raman amplification, if signal light power of at the input of the transmission fiber is appropriately set.

Improved signal quality through forward pumping will now be described with reference to FIG. 13. In FIG. 13 distance along the transmission fiber is plotted on the horizontal axis and average signal light power is plotted on the vertical axis. Average signal light power in transmission fiber for a system not applying Raman amplification is shown by (a) of FIG. 13. Here, if forward pumping light is injected from the input terminal of the transmission fiber, the signal light is amplified within the transmission fiber and signal power inside the transmission fiber changes as shown by (b) of FIG. 13. If, here, input signal power is lowered so that average signal light output from the transmission fiber is the same as before Raman amplification is applied, the result would be as shown by (c) of FIG. 13. This means that as it is possible to decrease input signal light power while maintaining the output signal light power from the transmission fiber constant (keeping deterioration caused by ASE constant). This means that nonlinear waveform distortion degradation from SPM-GVD can be reduced, leading to improved signal quality.

Four wave mixing (FWM) is another typical kind of nonlinear effect. FWM refers to the effect of power conversion between four lightwaves via the third order optical nonlinear effect of a transmission fiber.

This effect occurs whether the wavelengths of the four lightwaves are all the same, are all different or whether some are the same and some are not. Usually, the field of optical communication is concerned with the case where all four of the lightwaves are of different wavelengths or where two of the four lightwaves have the same wavelengths while the other 2 have different wavelengths. In the former case, if the wavelengths of the four lightwaves in ascending order of wavelength are $\lambda 1$, $\lambda 2$, $\lambda 3$, $\lambda 4$, power conversion between these four lightwaves through FWM arises when for example the following conditions are met:

$$\lambda 4 = \lambda 1 \times \lambda 2 \times \lambda 3 / (\lambda 1 \times \lambda 2 - \lambda 2 \times \lambda 3 + \lambda 3 \times \lambda 1)$$

If $\lambda 1 = 1530$ nm, $\lambda 2 = 1535$ nm, $\lambda 3 = 1580$ nm for example, power conversion between the four lightwaves occurs when $\lambda 4 = 1585$ nm. This results in the power elements of wavelengths $\lambda 1$, $\lambda 2$, $\lambda 3$ to be mixed into the lightwave of wavelength $\lambda 4$. (If there was no wave of wavelength $\lambda 4$ originally, a new lightwave would arise). Because these four lightwaves represent different wavelength channels, mixture of signal light leads to deterioration of signal quality (For example, for wavelength channel of $\lambda 4$, power elements $\lambda 1$, $\lambda 2$, $\lambda 3$ are noise). Thus, FWM should be avoided. A means for avoiding signal quality degradation caused by FWM is to allocate signal light wavelengths avoiding the conditions of the above expression. Lowering input signal light power into the transmission fiber is also effective because the FWM increase together with the power of the four lightwaves. Information on this method can be found in H. Suzuki et al, Optical Fiber Communication Conference and the International Conference on Integrated Optics and Optical Fiber Communication '99 Technical Digest, ThO4 or JP 2000-330145 A for example. Further, because power conversion efficiency in FWM decreases as the absolute value of the chromatic dispersion on transmission fiber increases, the effect of FWM can be suppressed by using transmission fiber with absolute value of chromatic dispersion equal to 2 ps/nm/km or greater at the wavelength bands of signal light. For wavelength band in the 1550 nm region for example, fiber with chromatic dispersion of 2 to 10 ps/nm/km, called nonzero dispersion shifted fiber, can be utilized.

If however Raman amplification is applied for fiber having chromatic dispersion of 2 to 10 ps/nm/km at the wavelength band of the signal light, problems arise. Even though the absolute value of chromatic dispersion may be sufficiently large at the wavelength band of the signal light, it may be too small at the wavelength region of the pumping light, leading FWM to occur strongly. Accordingly, due to FWM between pumping lights, and/or FWM between pumping lights and signal lights, there is a possibility of power mixture between pumping lights and signal lights, causing distortion and a deterioration in signal quality. This problem is particularly significant when the forward pumping configuration of Raman amplification is used. At present, there are no papers clarifying the issues and providing solutions concerning FWM effects on pumping light for Raman amplification, thus the problems remain unsolved.

SUMMARY OF THE INVENTION

Against the background of these problems the object of the present invention is to provide a Raman amplifier, pumping apparatus and program therefor that enables the problem of deterioration in signal quality to be avoided by suppressing the occurrence of lightwaves from FWM in wavelength bands of signal light by appropriately setting the wavelengths or power, or both, of pumping lights used for Raman amplification.

According to the present invention, in a Raman amplifier wherein signal light is provided with gain in a Raman amplification medium through the stimulated Raman effect and which comprises a pumping means for injecting pumping light into the Raman amplification medium, the wavelengths of the lightwaves are allocated so that wavelengths of lightwaves arising from a nonlinear effect of the pumping lights generated by the pumping means or the pumping light and the signal light, or both, do not fall within the wavelength band of the signal light.

Basically, this invention is characterized in that the pumping means generates pumping lights of a plurality of wavelengths and in respect of two arbitrary pumping lights of those pumping lights of a plurality of wavelengths, the peak wavelength, $\lambda$min, of pumping light having the shorter wavelength and the peak wavelength, $\lambda$max, of pumping light having the longer wavelength are in a relationship to the shortest wavelength of the wavelength band of the signal light, $\lambda$short and the longest wavelength of the wavelength band of the signal light, $\lambda$long, expressed as $$\lambda\text{short} > \lambda\text{min} \times \lambda\text{max}/(2\lambda\text{min} - \lambda\text{max})$$

or $$\lambda\text{min} \times \lambda\text{max}/(2\lambda\text{min} - \lambda\text{max}) > \lambda\text{long}.$$

Three arbitrary pumping lights from among the a plurality of pumping lights, the peak wavelengths of which three pumping lights satisfy the expression $$\lambda\text{min} < \lambda\text{mid} < \lambda\text{max}$$

are in a relationship to the shortest wavelength of the wavelength band of the signal light, $\lambda$short and the longest wavelength of the wavelength band of the signal light, $\lambda$long, expressed as $$\lambda\text{short} > \lambda\text{max} \times \lambda\text{mid} \times \lambda\text{min}/(\lambda\text{mid} \times \lambda\text{min} - \lambda\text{max} \times \lambda\text{mid} + \lambda\text{max} \times \lambda\text{min})$$

or $$\lambda\text{max} \times \lambda\text{mid} \times \lambda\text{min}/(\lambda\text{mid} \times \lambda\text{min} - \lambda\text{max} \times \lambda\text{mid} + \lambda\text{max} \times \lambda\text{min}) > \lambda\text{long}.$$

With the present invention, the wavelengths or the power, or both, of the pumping lights are allocated or set so that, lightwave power arising through a nonlinear effect of pumping lights generated by the pumping means, or the pumping light and the input light signal, or both, is, within the wavelength band of the signal light, at all points of the Raman amplification medium, 20 dB or more smaller than or one part per hundred or less of, the power of the signal light.

Thus, with the present invention, by setting the wavelength or power, or both, of pumping lights, deterioration of signal light quality due to lightwaves arising through FWM can be avoided or suppressed.

This invention is especially effective where the absolute value of chromatic dispersion in the transmission fiber is equal to or greater than 2 ps/nm/km and equal to or less than 10 ps/nm/km anywhere within the wavelength band of the signal light.

The present invention is also effective in a system wherein zero-dispersion wavelength of the transmission fiber is equal to or greater than the peak wavelength of the pumping light having the shortest peak wavelength from among the pumping lights and equal to or less than the peak wavelength of the pumping light having the longest peak wavelength from among the pumping lights. Further, this invention is especially effective when the forward pumping configuration is used.

That is to say, according to a first aspect of this invention, it is provided a Raman amplifier comprising a Raman amplification medium that provides signal light with gain though the stimulated Raman effect and a pumping means for injecting pumping lights of a plurality of wavelengths in this Raman amplification medium.

This invention is characterized by comprising a means for allocating wavelengths of the pumping lights, so that in respect of two arbitrary pumping lights among the pumping lights of a plurality of wavelengths generated by the pumping means, the peak wavelength λmin, of pumping light having the shorter wavelength and the peak wavelength λmax, of pumping light having the longer wavelength are in a relationship to the shortest wavelength of the wavelength band of the signal light, λshort and the longest wavelength of the wavelength band of the signal light, λlong, expressed as $$\lambda short > \lambda min \times \lambda max / (2\lambda min - \lambda max)$$

or $$\lambda min \times \lambda max / (2\lambda min - \lambda max) > \lambda long.$$

Alternatively, this invention is characterized by comprising a means for allocating wavelengths of the pumping lights so that three arbitrary pumping lights from among the pumping lights of a plurality of wavelengths generated by the pumping means, the peak wavelengths of which three pumping lights satisfy the expression $$\lambda min < \lambda mid < \lambda max$$

are in a relationship to the shortest wavelength of the wavelength band of the signal light, λshort and the longest wavelength of the wavelength band of the signal light, λlong, expressed as $$\lambda short > \lambda max \times \lambda mid \times \lambda min / (\lambda mid \times \lambda min - \lambda max \times \lambda mid + \lambda max \times \lambda min)$$

or $$\lambda max \times \lambda mid \times \lambda min / (\lambda mid \times \lambda min - \lambda max \times \lambda mid + \lambda max \times \lambda min) > \lambda long.$$

Alternatively, this invention is characterized by comprising a means for setting or allocating the wavelengths or the power, or both, of the pumping lights, so that the power of lightwaves arising through a nonlinear effect of the pumping lights generated by the pumping means, or of the pumping lights and the input signal, or both, is, within the wavelength band of the signal light, at all point of the Raman amplification medium, 20 dB or more smaller than or one part per hundred or less of, the power of the signal light. This nonlinear effect could be for example, FWM.

It is preferable for the Raman amplification medium to include optical fiber, the absolute value of the chromatic dispersion of which fiber is, equal to or greater than 2 ps/nm/km and equal to or less than 10 ps/nm/km anywhere within the wavelength band of the signal light.

It is also preferable for the Raman amplification medium to include optical fiber, the zero-dispersion wavelength of which optical fiber is equal to or greater than the peak wavelength of the pumping light having the shortest peak wavelength from among the pumping lights and equal to or less than the peak wavelength of the pumping light having the longest peak wavelength from among the pumping lights.

It is preferable for the present invention to provide a forward pumping means for transmitting at least a portion of pumping light generated by the pumping means, inside the Raman amplification medium in the same direction as the signal light.

According to a second aspect of this invention, it is provided a pumping apparatus comprising a pumping means for injecting pumping lights of a plurality of wavelengths into the Raman amplification medium that provides signal light with gain though the stimulated Raman effect.

The second aspect of this invention is characterized by comprising a means for allocating wavelengths of the pumping lights so that, in respect of two arbitrary pumping lights among the pumping lights of a plurality of wavelengths generated by the pumping means, the peak wavelength λmin, of pumping light having the shorter wavelength and the peak wavelength λmax, of pumping light having the longer wavelength are in a relationship to the shortest wavelength of the wavelength band of the signal light, λshort and the longest wavelength of the wavelength band of the signal light, λlong, expressed as $$\lambda short > \lambda min \times \lambda max / (2\lambda min - \lambda max)$$

or $$\lambda min \times \lambda max / (2\lambda min - \lambda max) > \lambda long.$$

Alternatively, the second aspect of this invention is characterized by comprising a means for allocating wavelengths of the pumping lights so that three arbitrary pumping lights from among the pumping lights of a plurality of wavelengths generated by the pumping means the peak wavelengths of which three pumping lights satisfy the expression $$\lambda min < \lambda mid < \lambda max$$

are in a relationship to the shortest wavelength of the wavelength band of the signal light, λshort and the longest wavelength of the wavelength band of the signal light, λlong, expressed as $$\lambda short > \lambda max \times \lambda mid \times \lambda min / (\lambda mid \times \lambda min - \lambda max \times \lambda mid + \lambda max \times \lambda min)$$

or $$\lambda max \times \lambda mid \times \lambda min / (\lambda mid \times \lambda min - \lambda max \times \lambda mid + \lambda max \times \lambda min) > \lambda long.$$

Alternatively, the second aspect of this invention is characterized by comprising a means for setting or allocating the wavelengths or the power, or both, of the pumping lights, so that the power of light arising from a nonlinear effect of the pumping lights generated by the pumping means, or of the pumping lights and the input signal, or both, is, within the wavelength band of the signal light, at all points of the Raman amplification medium, 20 dB or more smaller than or one part per hundred or less of, the power of the signal light. This nonlinear effect could be for example, FWM.

It is preferable for the second aspect of this invention to comprise a forward pumping means for transmitting at least a portion of pumping light generated by the pumping means in the same direction as the light signal inside the Raman amplification medium.

The third aspect of this invention is a program, characterized in that, installation of this program in an information processing system, provides for that information processing system, as functionality for allocating wavelengths of pumping lights applicable for a Raman amplifier comprising a Raman amplification medium that provides signal light with gain though the stimulated Raman effect and a pumping means for injecting pumping lights of a plurality of wavelengths into this Raman amplification medium, or for a pumping apparatus comprising a pumping means for injecting pumping lights of a plurality of wavelengths into a Raman amplification medium that provides signal light with gain though the stimulated Raman effect, functionality that realizes allocation of wavelengths of the pumping lights so that, in respect of two arbitrary pumping lights among the pumping lights of a plurality of wavelengths generated by the pumping means, the peak wavelength λmin, of pumping light having the shorter wavelength and the peak wavelength λmax, of pumping light having the longer wavelength are in a relationship to the shortest wavelength of the wavelength band of the signal light, λshort and the longest wavelength of the wavelength band of the signal light, λlong, expressed as λshort>λmin×λmax/(2λmin−λmax)

or

λmin×λmax/(2λmin−λmax)>λlong.

Alternatively, the third aspect of this invention realizes functionality for allocating wavelengths of the pumping lights wherein three arbitrary pumping lights from among the pumping lights of a plurality of wavelengths generated by the pumping means, the peak wavelengths of which three pumping lights satisfy the expression λmin<λmid<λmax are in a relationship to the shortest wavelength of the wavelength band of the signal light, λshort and the longest wavelength of the wavelength band of the signal light, λlong, expressed as λshort>λmax×λmid×λmin/(λmid×λmin−λmax×λmid+λmax×λmin)

or

λmax×λmid×λmin/(λmid×λmin−λmax×λmid+λmax×λmin)>λlong.

Moreover, installing the program according to the third aspect of this invention in an information processing system, comprises that information processing system, as functionality for allocating or setting the wavelengths or power, or both, of pumping lights applicable for a Raman amplifier comprising a Raman amplification medium that provides signal light with gain though the stimulated Raman effect and a pumping means for injecting pumping lights of a plurality of wavelengths into this Raman amplification medium, or for a pumping apparatus providing a pumping means for injecting pumping lights of a plurality of wavelengths in a Raman amplification medium that provides signal light with gain though the stimulated Raman effect, functionality that realizes allocation or setting of the wavelengths or power, or both, of the pumping lights, so that the power of light arising through a nonlinear effect of pumping lights generated by the pumping means, or of pumping lights and the signal light, or both, is, within the wavelength band of the signal light, at all points of the Raman amplification medium, 20 dB or more smaller than or one part per hundred or less of, the power of the signal light. This nonlinear effect could be for example, FWM.

By recording the program of this invention onto a recording medium, the recording medium can be used to install the program of this invention in the information processing system. Alternatively, the program of this invention can be installed directly in the information processing system from a server storing the program connected to the system via a network.

Accordingly, a Raman amplifier and pumping apparatus can be realized that enable the problem of deterioration in signal quality to be avoided by means of suppressing the occurrence of lightwaves from FWM in the wavelength band of signal light by setting the wavelengths or power or both the wavelengths and power of pumping light used for Raman amplification appropriately using an information processing system like a computer.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 5:
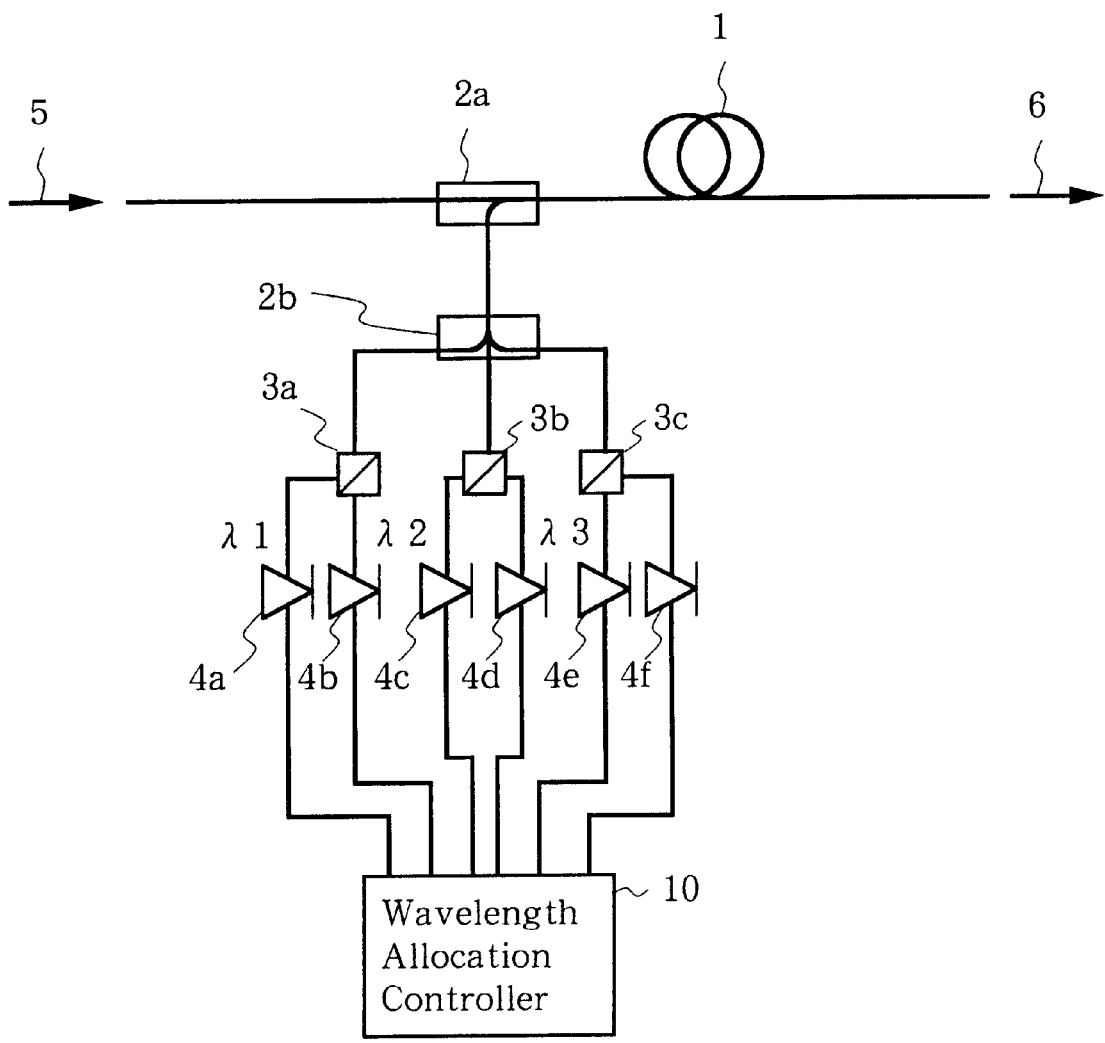
FIG. 5 shows the configuration of a Raman amplifier according to the second embodiment of this invention.

A Raman amplifier according to an embodiment of the present invention will now be described with reference to FIG. 5. FIG. 5 shows the configuration of a Raman amplifier according to a preferred embodiment of this invention. As shown in FIG. 5, this invention is a Raman amplifier comprising optical fiber 1 for a Raman amplification medium that provides input signal light 5 with gain through the stimulated Raman effect, and pumping laser diodes 4a–4f that inject pumping lights of a plurality of wavelengths into optical fiber 1.

This invention is characterized by comprising a wavelength allocation controller 10 for allocating wavelengths of the pumping lights so that, in respect of two arbitrary pumping lights among the pumping lights of three wavelengths generated by the pumping laser diodes 4a–4f, the peak wavelength, λmin, of pumping light having the shorter wavelength and the peak wavelength, λmax, of pumping light having the longer wavelength are in a relationship to the shortest wavelength of the wavelength band of input signal light 5 and the longest wavelength of the wavelength band of input signal light 5, expressed as λshort>λmin×λmax/(2λmin−λmax)

or

λmin×λmax/(2λmin−λmax)>λlong.

Alternatively, wavelength allocation controller 10 allocates wavelengths of the pumping lights so that the pumping lights of three wavelengths generated by pumping laser diodes 4a–4f, the peak wavelengths of which three pumping lights satisfy the expression $$\lambda min < \lambda mid < \lambda max$$

are in a relationship to the shortest wavelength, λshort, of the wavelength band of input signal light 5 and the longest wavelength, λlong, of the wavelength band of input light signal 5, expressed as $$\lambda short > \lambda max \times \lambda mid \times \lambda min/(\lambda mid \times \lambda min - \lambda max \times \lambda mid + \lambda max \times \lambda min)$$

or $$\lambda max \times \lambda mid \times \lambda min/(\lambda mid \times \lambda min - \lambda max \times \lambda mid + \lambda max \times \lambda min) > \lambda long.$$

Alternatively, wavelength allocation controller 10 sets or allocates the wavelengths or the power, or both, of the pumping lights, so that the power of lightwaves arising through a nonlinear effect of the pumping lights generated by pumping laser diodes 4a–4f, or of the pumping lights and the input signal light 5, or both, is, within the wavelength band of input signal light 5 of the signal light, at all points of optical fiber 1, 20 dB or more smaller than or one part per hundred or less of, the power of input signal light 5. This nonlinear effect could be for example, FWM.

The absolute value of the chromatic dispersion of this optical fiber 1 is equal to or greater than 2 ps/nm/km and equal to or less than 10 ps/nm/km anywhere within the wavelength band of the signal light.

Further, the zero-dispersion wavelength of this optical fiber 1 is equal to or greater than the peak wavelength of the pumping light having the shortest peak wavelength from among the pumping lights and equal to or less than the peak wavelength of the pumping light having the longest peak wavelength from among the pumping lights.

This embodiment shows an example of forward pumping light transmitting at least a portion of pumping light generated by pumping laser diodes 4a–4f, inside optical fiber 1 in the same direction as the signal light. With this embodiment, for a Raman amplification medium a Raman amplifier including optical fiber 1 as an element of its composition is described, however the same description could also be given for a pumping apparatus, not including optical fiber 1 as an element of its composition, used for introducing pumping light in another prepared optical fiber 1.

Wavelength allocation controller 10 of this embodiment can be realized by means of using a computer system for an information processing system. That is to say, by installing in such a computer system a program that realizes functionality for allocating wavelengths of the pumping lights so that, in respect of two arbitrary pumping lights among pumping lights of three wavelengths generated by pumping laser diodes 4a–4f, the peak wavelength, λmin, of pumping light having the shorter wavelength and the peak wavelength, λ max, of pumping light having the longer wavelength are in a relationship to the shortest wavelength of wavelength band of input signal light 5 and the longest wavelength of wavelength band of input signal light 5 expressed as $$\lambda short > \lambda min \times \lambda max/(2 \lambda min - \lambda max)$$

or $$\lambda min \times \lambda max/(2 \lambda min - \lambda max) > \lambda long$$

functionality is realized suitable for wavelength allocation controller 10 that allocates wavelengths of pumping light applicable for a Raman amplifier providing optical fiber 1 that provides input signal light 5 with gain through the stimulated Raman effect and pumping laser diodes 4a–4f that introduce signal light of a plurality of wavelengths into optical fiber 1. This computer system can be used to realize the functionalities required for wavelength allocation controller 10.

Alternatively, by installing in a computer system a program that realizes functionality for allocating wavelengths of the pumping lights so that the pumping lights of three wavelengths generated by pumping laser diodes 4a–4f, the peak wavelengths of which three pumping lights satisfy the expression $$\lambda min < \lambda mid < \lambda max$$

are in a relationship to the shortest wavelength of the wavelength band of input signal light 5 and the longest wavelength of the wavelength band of input signal light 5 expressed as $$\lambda short > \lambda max \times \lambda mid \times \lambda min/(\lambda mid \times \lambda min - \lambda max \times \lambda mid + \lambda max \times \lambda min)$$

or $$\lambda max \times \lambda mid \times \lambda min/(\lambda mid \times \lambda min - \lambda max \times \lambda mid + \lambda max \times \lambda min) > \lambda long$$

functionality suitable for wavelength allocation controller 10 is provided, and such a computer system can be used to realize the functionalities required for wavelength allocation controller 10.

Alternatively, by installing in a computer system a program that realizes functionality for setting or allocating the wavelengths or the power, or both, of the pumping lights, so that the power of lightwaves arising through a nonlinear effect of pumping lights generated by pumping laser diodes 4a–4f, or of pumping lights and the input signal light 5, or both, is, within the wavelength band of input signal light 5, at all points of optical fiber 1, 20 dB or more smaller than or one part per hundred or less of, the power of input signal light 5, functionality suitable for wavelength allocation controller 10 is provided, and such a computer system can be used to realize the functionalities required for wavelength allocation controller 10.

By recording the program of this invention onto a recording medium, the recording medium can be used to install the program of this invention in such a computer system, or alternatively, the program of this invention can be installed directly in such a computer system from a server housing the program connected to the computer via a network. Thus, wavelength allocation controller 10 could then be realized using that computer system.

A more detailed explanation of the embodiments will now be provided.

First Embodiment

Figure 1:
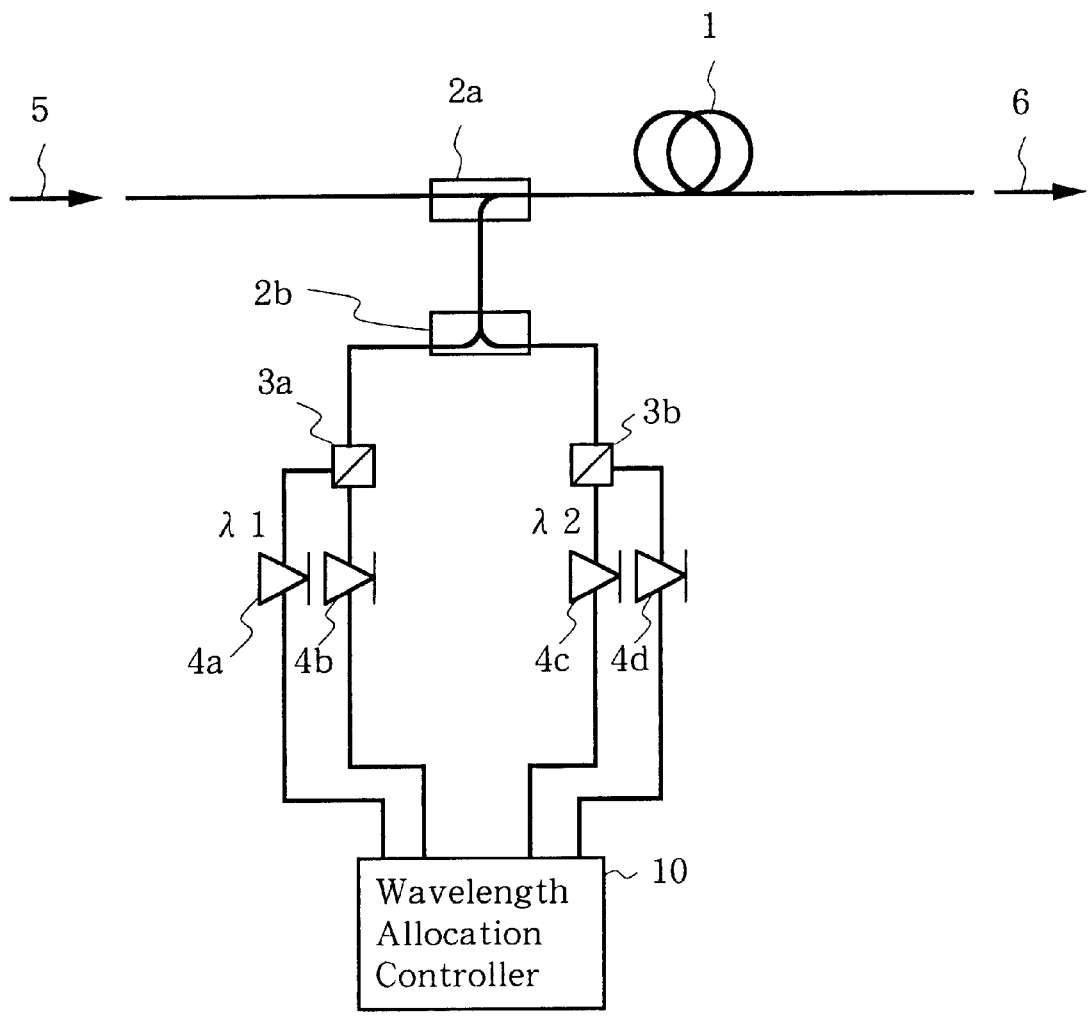
FIG. 1 shows the configuration of a Raman amplifier according to the first embodiment of this invention.

The first embodiment of this invention will now be described with reference to FIG. 1. Input signal light 5 injected in from the left-hand side of the drawing, is introduced into optical fiber 1 via WDM coupler 2a. Pumping lights of peak wavelength λ1, generated by pumping laser diodes (hereinafter "pumping LD") 4a and 4b are injected into PBS (polarization beam splitter) 3a in mutually orthogonal polarizations to be polarization-division multiplexed. In the same way, pumping lights of peak wavelength λ2 (>λ1) generated from LD 4c and 4d are polarization-division multiplexed in PBS 3b. Polarization-division multiplexed pumping lights of λ1 and λ2 are further wavelength division multiplexed by WDM coupler 2b. The wavelength division multiplexed pumping lights are introduced via WDM coupler 2a into optical fiber 1 in the same direction as the signal light, and, by means of the stimulated Raman effect, provide this signal light with gain. This signal light, now amplified is ejected from the right side of the drawing as output signal light 6.

Figure 2:
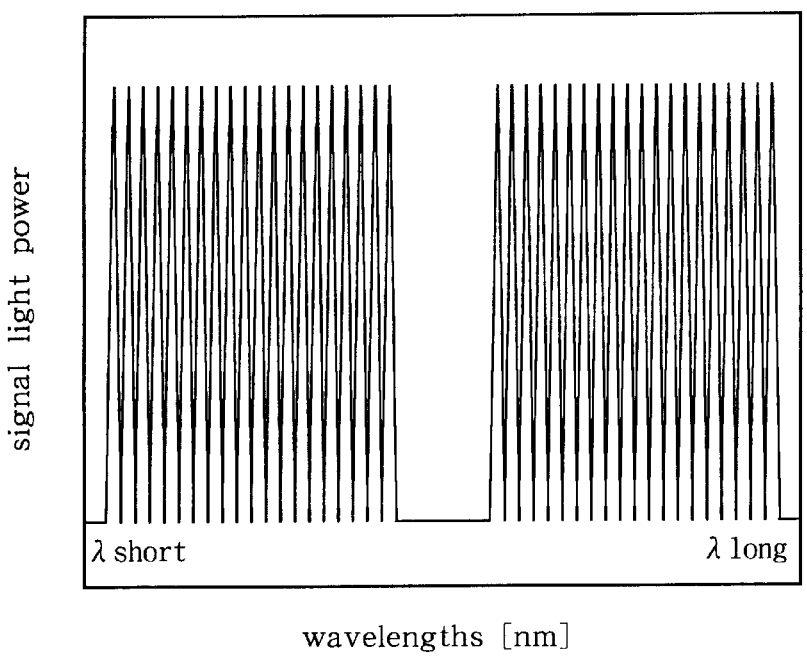
FIG. 2 shows wavelengths of signal light.

It is pertinent to describe here, the input signal light 5 and the wavelength of the pumping lights. As shown in FIG. 2, there is the shortest wavelength, λshort, of the wavelength band of input signal light 5 and the longest wavelength, λlong, of the wavelength band of input signal light 5. At this point, for this embodiment, the peak wavelengths λ1 and λ2 of pumping light are set so as to satisfy the following expression.

$$\lambda short > \lambda 1 \times \lambda 2 \times (2\lambda 1 - \lambda 2)$$

or $$\lambda 1 \times \lambda 2 \times (2\lambda 1 - \lambda 2) > \lambda long$$

Resultantly, because the light arising of $$wavelength\ \lambda FWM = \lambda 1 \times \lambda 2 / (2\lambda 1 - \lambda 2)$$

through FWM of pumping wavelengths does not interfere with signal light, signal degradation through lightwaves arising due to FWM of pumping lights can be avoided. In FIG. 2, wavelength is plotted on the horizontal axis and signal light power on the vertical axis.

The flow of basic pumping lightwave definition as executed by wavelength allocation controller 10 will now be described with reference to the flow chart of FIG. 6. Firstly, the wavelength band of input signal light 5 is defined. Next, wavelengths of a Raman pumping light source are allocation so that Raman gain arises in at least a portion of that wavelength band. Then, it must be confirmed that the pumping wavelengths satisfy the conditions of the previous expression. If those conditions are satisfied signal deterioration through FWM has been avoided, so power of each pumping light and power of input signal light 5 are defined. If those conditions are not satisfied, the allocation of pumping light is changed. Reducing the number of pumping lights is conceivable here for example. If those conditions cannot be satisfied simply by changing the allocation of pumping light, the wavelength band of signal light is changed.

Figure 3:
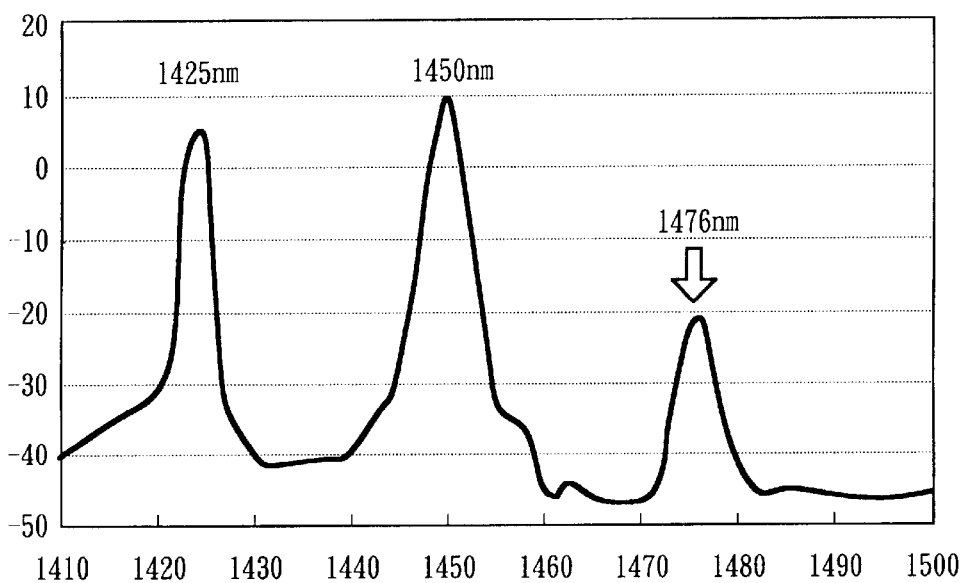
FIG. 3 shows power of lightwaves generated by FWM.

Consider for example that pumping peak wavelength λ1=1425 nm and λ2=1450 nm. Here, the wavelength of light arising through FWM of pumping lights is λFWM=1476 nm. For example, FIG. 3 shows the light spectrum at the fiber output terminal when light of λ1 and λ2 is introduced at 100 mW each into nonzero dispersion shifted fiber 40 km long in the forward direction to the fiber. In FIG. 3 wavelength is plotted on the horizontal axis and power on the vertical. The resolution of the spectrum is 2 nm. From this drawing it is evident that for wavelength 1476 nm, light having power of approximately −21 dBm per 2 nm arises through FWM of pumping lights (refer to the subsequent note for the method of calculating power of lightwaves arising through FWM). This lightwave creates interference with signal light of wavelength 1476 nm (S band). This may cause deterioration of signal quality. This problem is solved by this invention by setting the shortest wavelength of signal light of S band at a wavelength greater than 1476 nm.

Figure 6:
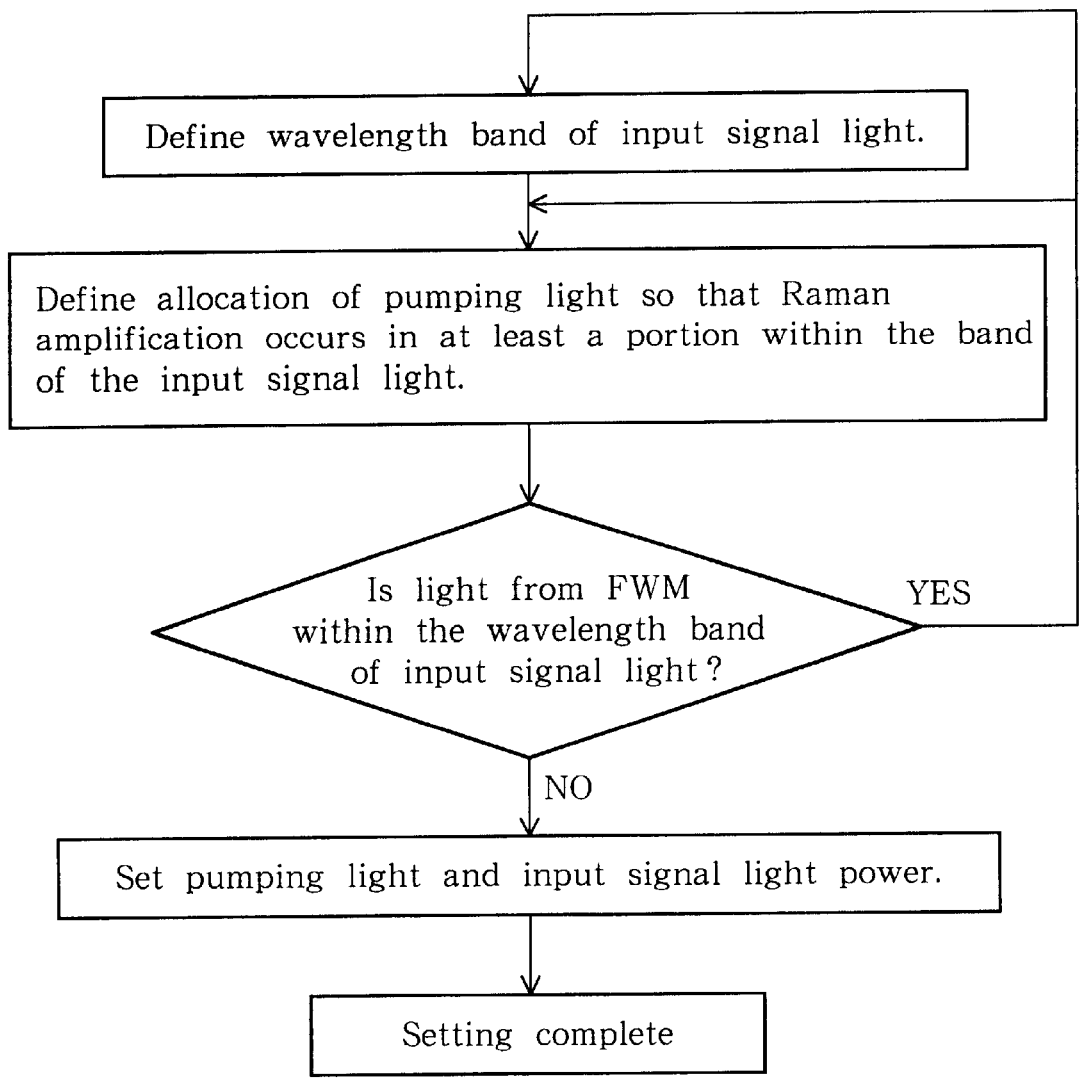
FIG. 6 is a flowchart showing the basic flow for defining pumping wavelength executed by the wavelength allocation controller.

Wavelength allocation controller 10 has been described with reference to execution of procedures for pumping wavelength definition as shown in FIG. 6, for each definition of wavelength bands of input signal light 5. However, a simplified configuration of wavelength allocation controller 10 can be obtained through a computer system having high-speed processing functionality wherein the pumping light wavelength definition procedures shown in FIG. 6 are performed in advance for each wavelength band of a plurality of input signal lights 5, thereby defining pumping light wavelengths. Based on those results, a table can be prepared recording a plurality of pumping wavelengths relating to a plurality of wavelength bands of input signal light 5. This table can then be installed in wavelength allocation controller 10 so that the processes of part 10 can be executed simply by referencing pumping light wavelength coordinated for defined wavelength bands of input signal light 5 from the table to define the appropriate pumping light wavelength.

On the spectrum of FIG. 3, it appears that light arises through FWM of approximately −21 dB per 2 nm in the wavelength 1476 nm region, however this value is actually the sum of lightwaves arising through FWM in the wavelength 1467 nm wavelength region and the power of other lightwaves (chiefly Raman ASE). Accordingly, to calculate power of lightwaves actually arising through FWM, the power of those other lightwaves must be deducted, as shown in the following expression. That is to say, power of lightwaves arising through FWM [W][ ]

=(power on spectrum analyzer [W])

−(power of those other lightwaves [W]).

Figure 4:
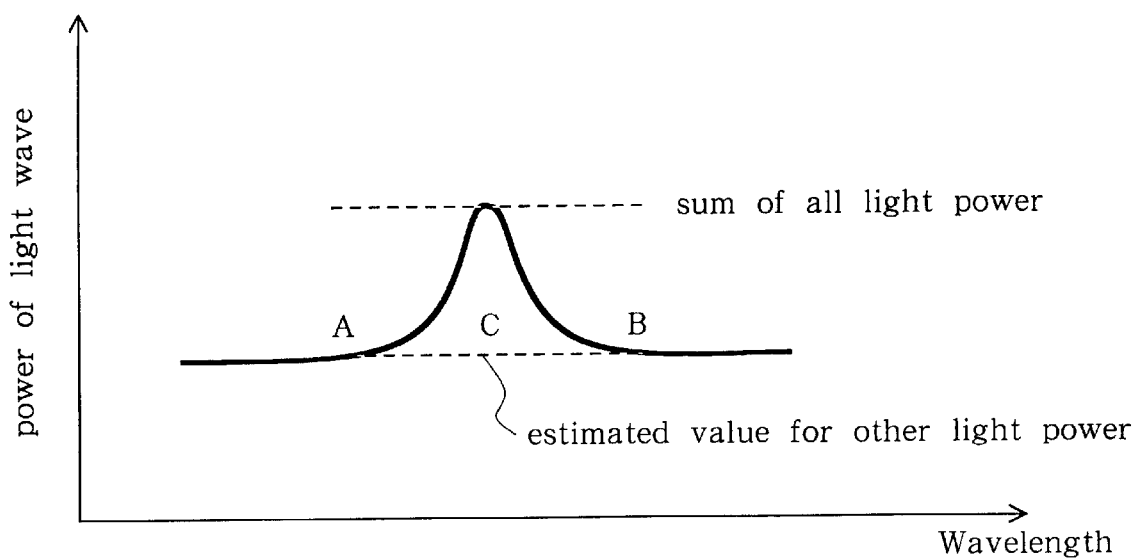
FIG. 4 illustrates a typical method for estimating the power of lightwaves other than lightwaves generated by FWM, like Raman ASE.

However, because the only information obtainable from the spectrum is the power of all lightwaves, the power of those other lightwaves is normally obtained by estimation. As shown in FIG. 4, for a typical method of estimating the power of those other lightwaves, the method of collinear approximation from the power of those other lightwaves at wavelengths of that region can be cited. In FIG. 4 wavelength is plotted against the horizontal axis and lightwave power on the vertical axis. With this method the values for the power of those other lightwaves, in the region (point A and point B) of wavelengths of lightwaves arising through FWM are joined by a straight line, and the value for the power of those other lightwaves at the point to be estimated, (point C) is approximated as the value on that straight line. For example, in FIG. 3, the power of those other lightwaves at 1470 nm is −46.4 dBm (2.29×10$^{-8}$ W), and the power of those other lightwaves at 1482 nm is −45.1 dBm (3.09×10$^{-8}$ W), therefore, the power of those other lightwaves at 1476 nm is estimated at −45.7 dBm (2.69×10$^{-8}$ W).

Accordingly, as described above, power on the spectrum analyzer at 1476 nm is

−21.4 dBm (7.24×10$^{-6}$ W)

therefore, the power of light through FWM is 7.24×10$^{-6}$−2.69×10$^{-8}$=7.22×10$^{-6}$ W (−21.41 dBm).

Because in this example, the power of those other lights is low, there is almost no difference between power on the spectrum analyzer and the power of lightwaves arising through FWM. Where however, the power of those other lights is relatively high, as in the subsequent example, this difference becomes great thereby necessitating performance of such calculations.

Second Embodiment

The second embodiment of this invention will now be described with reference to FIG. 5. Input signal light 5 injected in from the left-hand side of the drawing, is introduced into optical fiber 1 via WDM coupler 2a. Pumping lights of peak wavelength $\lambda 1$, generated by LD 4a and 4b are injected into PBS (polarization beam splitter) 3a in mutually orthogonal polarizations to be polarization-division multiplexed. In the same way, pumping lights of peak wavelength $\lambda 2$ (>$\lambda 1$) generated from LD 4c and 4d are polarization-division multiplexed in PBS 3b. Further, pumping lights of peak wavelength $\lambda 3$ (>$\lambda 2$>$\lambda 1$) generated from LD 4e and 4f are polarization-division multiplexed in PBS 3c. Polarization-division multiplexed pumping lights of $\lambda 1$, $\lambda 2$ and $\lambda 3$ are wavelength division multiplexed through WDM coupler 2b. The wavelength division multiplexed pumping lights are introduced via WDM coupler 2a into optical fiber 1 in the same direction as input signal light 5, and, through the stimulated Raman effect, provide the signal light with gain. The signal light amplified is ejected from the right side of the drawing as output signal light 6.

It is pertinent here to describe input signal light 5 and the wavelengths of the pumping lights. As shown in FIG. 2, there is the shortest wavelength, $\lambda$short, of the wavelength band of input signal light 5 and the longest wavelength, $\lambda$long, of the wavelength band of input signal light 5. At this point, for this second embodiment, the peak wavelengths $\lambda 1$, $\lambda 2$ and $\lambda 3$ of pumping lights are set so as to satisfy the following expression.

$$\lambda\text{short} > \lambda 3 \times \lambda 2 \times \lambda 1/(\lambda 2 \times \lambda 1 - \lambda 3 \times \lambda 2 + \lambda 3 \times \lambda 1)$$

or $$\lambda 3 \times \lambda 2 \times \lambda 1/(\lambda 2 \times \lambda 1 - \lambda 3 \times \lambda 2 + \lambda 3 \times \lambda 1) > \lambda\text{long}$$

Resultantly, because the light arising of $$\text{wavelength } \lambda\text{FWM} = \lambda 3 \times \lambda 2 \times \lambda 1/(\lambda 2 \times \lambda 1 - \lambda 3 \times \lambda 2 + \lambda 3 \times \lambda 1)$$

through FWM of pumping light wavelengths does not interfere with input signal light 5, signal degradation through lightwaves arising due to FWM of pumping lights can be avoided.

Figure 8:
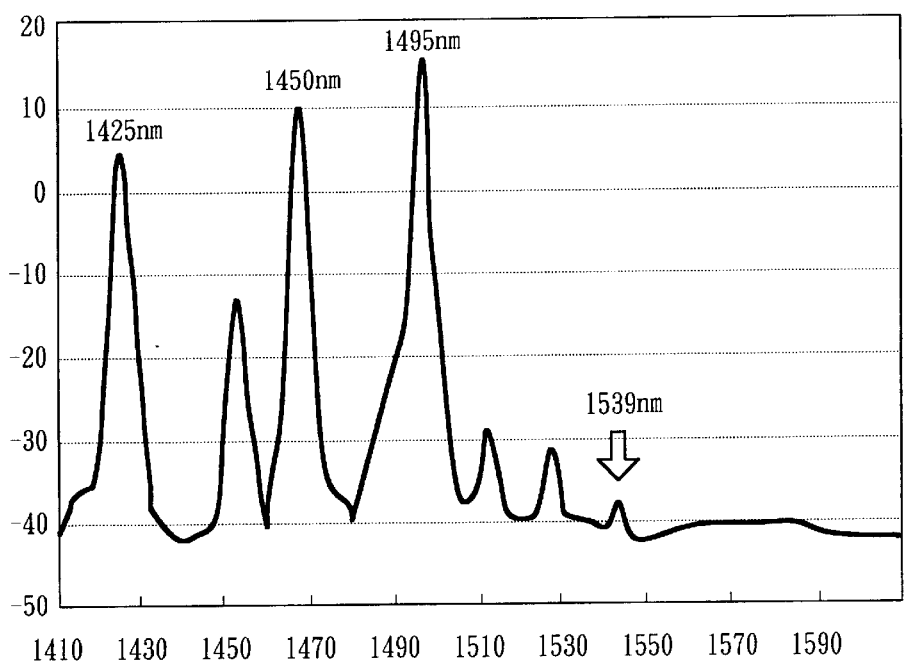
FIG. 8 shows power of lightwaves generated by FWM.

Consider for example that the peak wavelength of pumping lights are $\lambda 1$=1425 nm, $\lambda 2$=1450 nm and $\lambda 3$=1495 nm. Here, the wavelength of light arising through FWM of pumping lights is $\lambda$FWM=1539 nm. For example, FIG. 8 shows the light spectrum of a fiber output terminal when light of $\lambda 1$, $\lambda 2$ and $\lambda 3$ is introduced at 250 mW, 100 mW and 100 mW respectively into nonzero dispersion shifted fiber 40 km long in the forward direction of the fiber. In FIG. 8, wavelength is plotted on the horizontal axis and power on the vertical. The resolution of the spectrum is 2 nm. From this drawing it is evident that for wavelength 1539 nm, light having power of approximately −41 dBm (the value after an estimated value for power of other pumping lights is subtracted) per 2 nm arises through FWM of pumping lights. This lightwave creates interference with signal light of wavelength 1539 nm (C band) which may cause deterioration of signal quality. This problem is solved by this invention by setting the shortest wavelength of signal light of C band at a wavelength greater than 1539 nm or by making the pumping lights into a 2 wavelength configuration of $\lambda 1$ and $\lambda 2$ only. However, where this 2 wavelength configuration is used, because the wavelength of lightwaves arising through FWM is 1507 nm, the wavelength band of input signal light 5 must be set so as not to coincide with that wavelength.

Third Embodiment

The third embodiment of this invention will now be described. For this third embodiment pumping light wavelengths are $\lambda 1$, $\lambda 2$ (>$\lambda 1$) and $\lambda 3$ (>$\lambda 2$>$\lambda 1$). The configuration for the third embodiment is the same as that for the second embodiment shown in FIG. 5. For the third embodiment however, at any position of optical fiber 1, wavelengths of pumping lights and pumping light power or both are set so the power of lightwaves of $$\text{wavelength } \lambda\text{FWM} = \lambda 3 \times \lambda 2 \times \lambda 1/(\lambda 2 \times \lambda 1 - \lambda 3 \times \lambda 2 + \lambda 3 \times \lambda 1)$$

arising through FWM of pumping lights is 20 dB or more smaller than or one part per hundred or less of, signal light power with wavelength at $\lambda$FWM. Resultantly, signal deterioration between the input signal light 5 and the lightwaves arising of $$\text{wavelength } \lambda\text{FWM} = \lambda 3 \times \lambda 2 \times \lambda 1/(\lambda 2 \times \lambda 1 - \lambda 3 \times \lambda 2 + \lambda 3 \times \lambda 1)$$

through FWM can be suppressed.

The basic flow of pumping lightwave definition as executed through wavelength allocation controller 10 will now be described with reference to the flow chart of FIG. 7. Firstly, the wavelength band of input signal light 5 is defined. Next, wavelengths of a Raman pumping light source are allocated so that Raman gain arises in at least a portion of that wavelength band. Then, power of input signal light 5 and the power of each pumping light are set. Thereafter, confirmation, either through experiments or calculations is made to determine whether, at any part of the optical fiber, power of lightwaves of wavelength $\lambda$FWM= $\lambda 3 \times \lambda 2 \times 1/(\lambda 2 \times \lambda 1 - \lambda 3 \times \lambda 2 + \lambda 3 \times \lambda 1)$ arising through FWM of pumping lights is 20 dB or more smaller than or one part per hundred or less of, power of input signal light 5 with wavelength at $\lambda$FWM. If those conditions are satisfied signal deterioration through FWM is small and suppressed so the setting is complete. If those conditions are not satisfied, the power of pumping light must be changed (by lowering pumping light power). If those conditions cannot be satisfied simply by changing the power of pumping light, the power of input signal light 5, wavelength allocation of pumping lights and/or wavelength allocation of input signal light 5 may be changed.

Figure 7:
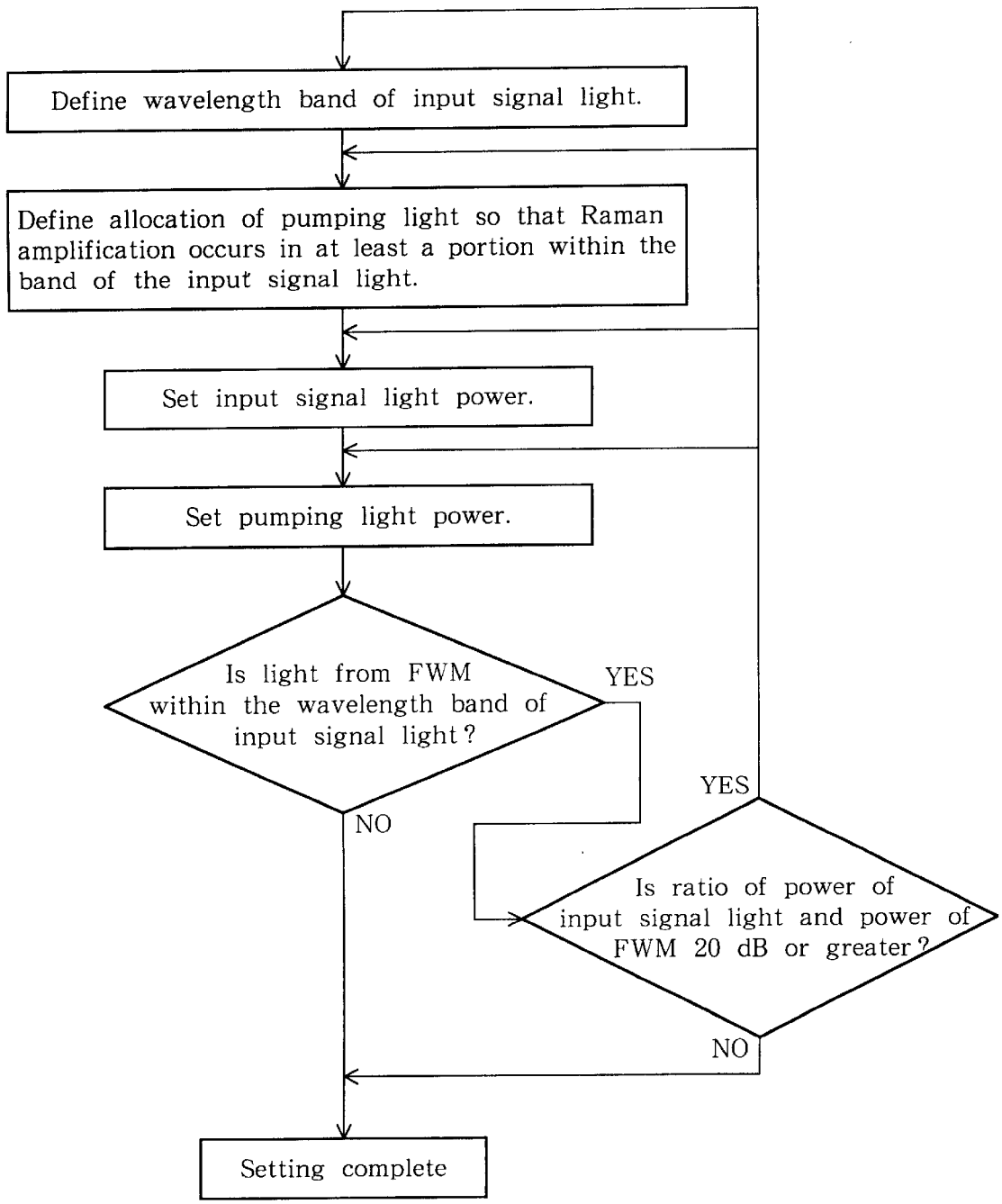
FIG. 7 is a flowchart showing the basic flow for defining pumping wavelength executed by the wavelength allocation controller.

Wavelength allocation controller 10 has been described with reference to execution of procedures for pumping wavelength definition as shown in FIG. 7, for each definition of wavelength band of input signal light 5. However, a simplified configuration of wavelength allocation controller 10 can be obtained through a computer system having high-speed processing functionality wherein the pumping light wavelength definition procedures shown in FIG. 7 are performed in advance for each wavelength band of a plurality of input signal lights 5, thereby defining pumping light wavelengths. Based on those results, a table can be prepared recording a plurality of pumping wavelengths and power relating to a plurality of wavelength bands of input signal light 5. This table can then be installed in wavelength allocation controller 10 so that the processes of part 10 can be executed simply by referencing pumping light wavelength and power coordinated for defined wavelength bands of input signal light 5 from the table to define the appropriate pumping light wavelength and power.

For this third embodiment, take for example that there are pumping lights of peak wavelengths $\lambda 1$=1425 nm, $\lambda 2$=1450 nm and $\lambda 3$=1495 nm (here, the wavelength of light arising through FWM of pumping lights is $\lambda$FWM=1539 nm).

Further, the shortest wavelength of input signal light 5 is 1550 nm and the longest wave is 1605 nm. Here, there is a possibility of lightwaves arising through FWM of pumping lights creating interference with input signal light 5 with substantial deterioration of signal quality resulting.

Figure 9:
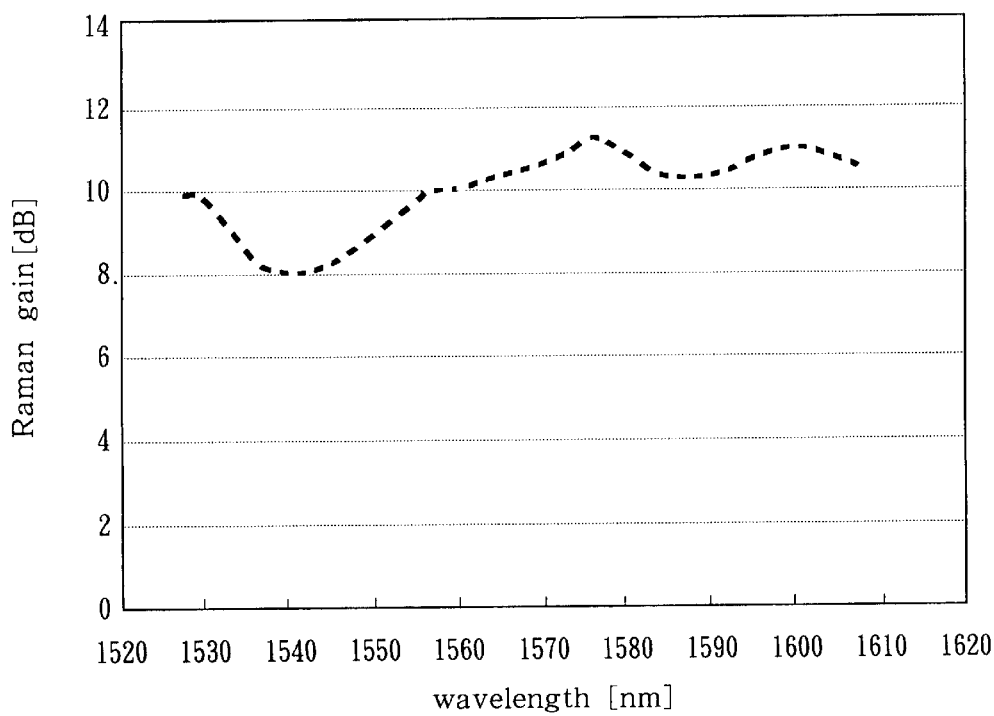
FIG. 9 shows simulation results Raman gain calculation.

For example, where in a Raman amplification medium of nonzero dispersion shifted fiber 40 km long, pumping lights of $\lambda 1$, $\lambda 2$ and $\lambda 3$ are introduced at approximately 250 mW, approximately 100 mW and approximately 100 mW respectively, as shown in FIG. 8, for wavelength 1539 nm, lightwaves of approximately −41 dBm per 2 nm arise through FWM of pumping lights. At such times, simulated calculations show that Raman amplification is approximately 8 dB, as shown in FIG. 9. In FIG. 9, lightwaves are plotted on the horizontal axis and Raman amplification on the vertical. Further, loss for signal light wavelengths of the Raman amplification medium is approximately 8 dB. Accordingly, where the power of input signal light 5 input in the Raman amplification medium is −5 dBm per 1 wavelength channel, signal light power at a fiber output terminal is $$-5-8+8=-5 \text{ dBm.}$$

On the other hand, as described, at an output terminal of the fiber the power of lightwaves arising through FWM of pumping lights is approximately −41 dBm, therefore the ratio to signal light is estimated to be approximately 36 dB. With this invention, pumping light wavelengths or power or both are allocated or set so that the ratio of the power of input signal light 5 to power of lightwaves arising through FWM is 20 dB or greater. For example, where the power of input signal light 5 input in the Raman amplification medium is −25 dBm per one wavelength channel, signal light power at a fiber output terminal is $$-25-8+8=-25 \text{ dBm}$$

and the ratio of the power of input signal light 5 and the power of lightwaves arising through that FWM for example, is 16 dB, considerably below 20 dB. Here, there is considerable signal degradation through lightwaves arising through FWM. To avoid this, in accordance with this invention, the power of each pumping light is lowered so that lightwaves through FWM are less generated, or the wavelengths of pumping light are changed so that lightwaves through FWM in a wavelength band of signal light does not occur, or both of these can be performed. These measures are effective in reducing deterioration.

Figure 10:
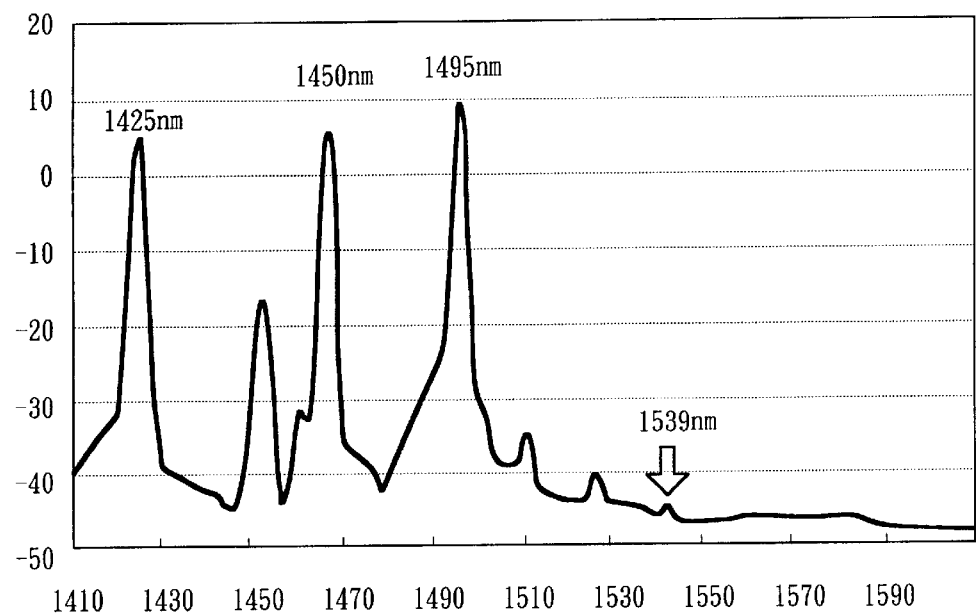
FIG. 10 shows power of lightwaves generated by FWM.
Figure 11:
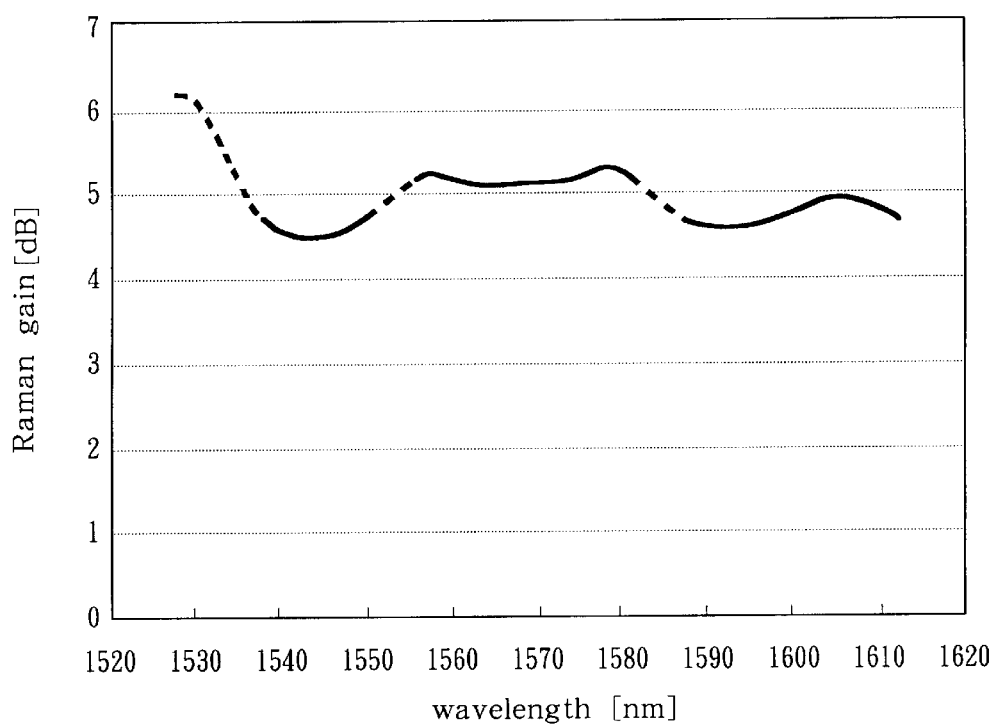
FIG. 11 shows simulation results Raman gain calculation.

Consider for example where pumping light power $\lambda 1$, $\lambda 2$ and $\lambda 3$ set at approximately 250 mW, approximately 100 mW and approximately 100 mW respectively are lowered to approximately 150 mW, approximately 50 mW and approximately 50 mW respectively. Here, as shown in FIG. 10, the power of lightwaves arising through FWM at 1539 nm, apart from the power of those other lightwaves, is approximately −50 dBm. In FIG. 10, lightwaves are plotted on the horizontal axis and power on the vertical. Further, in accordance with the simulated results shown in FIG. 11, Raman amplification at such times is 4.5 dB. In FIG. 11 wavelength is plotted on the horizontal axis and Raman amplification on the vertical. Accordingly, even though power of input signal light 5 is −25 dBm per 1 wavelength channel, in accordance with calculations described above, the ratio of the power of input signal light 5 and the power of lightwaves arising through the FWM is 21.5 dB, which is above 20 dB. Thus, by setting pumping light power appropriately, in accordance with this invention, the effects of signal degradation due to lightwaves arising through FWM can be suppressed.

Fourth Embodiment

Figure 12:
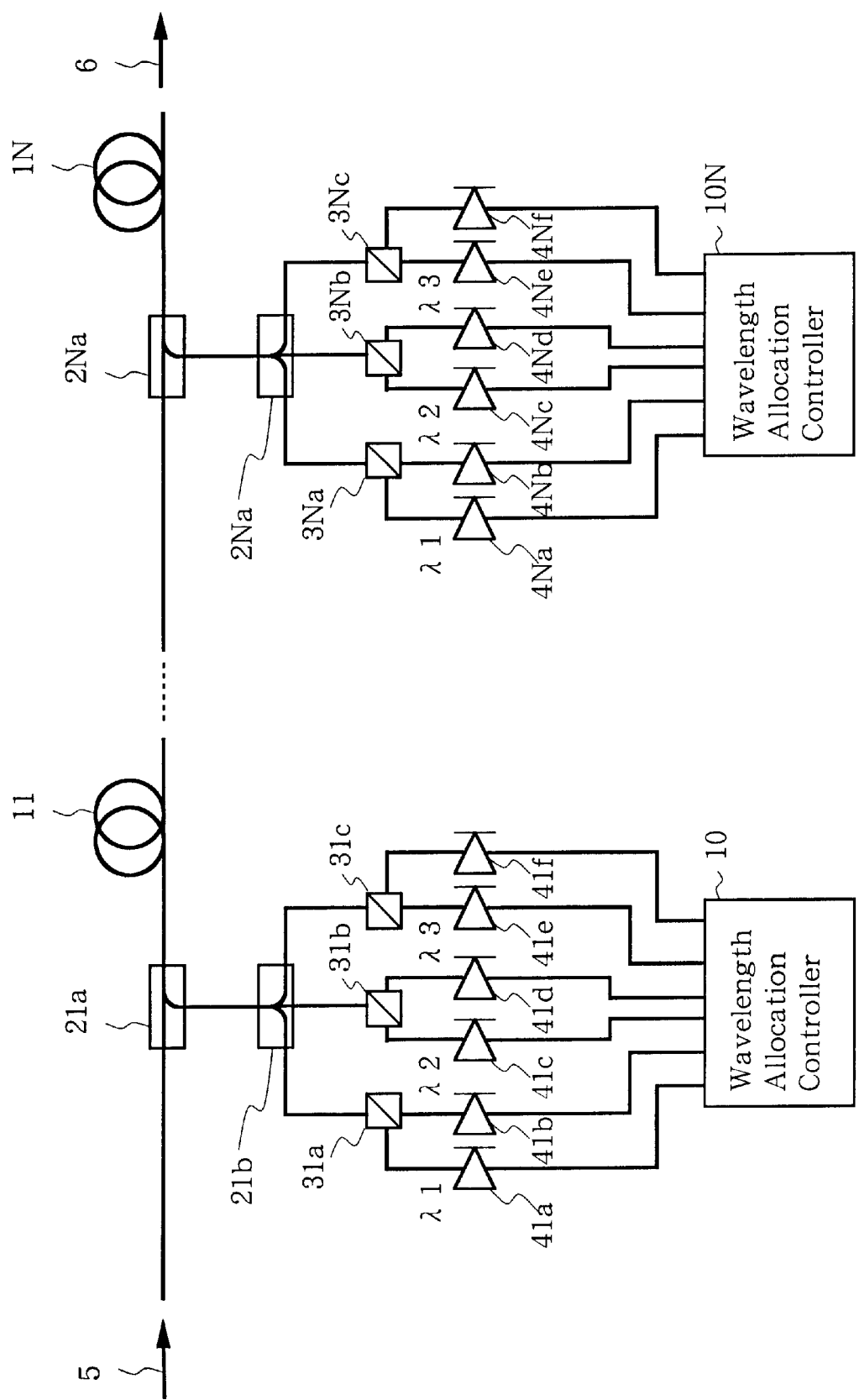
FIG. 12 shows the configuration of a Raman amplifier according to the fourth embodiment of this invention.
Figure 13:
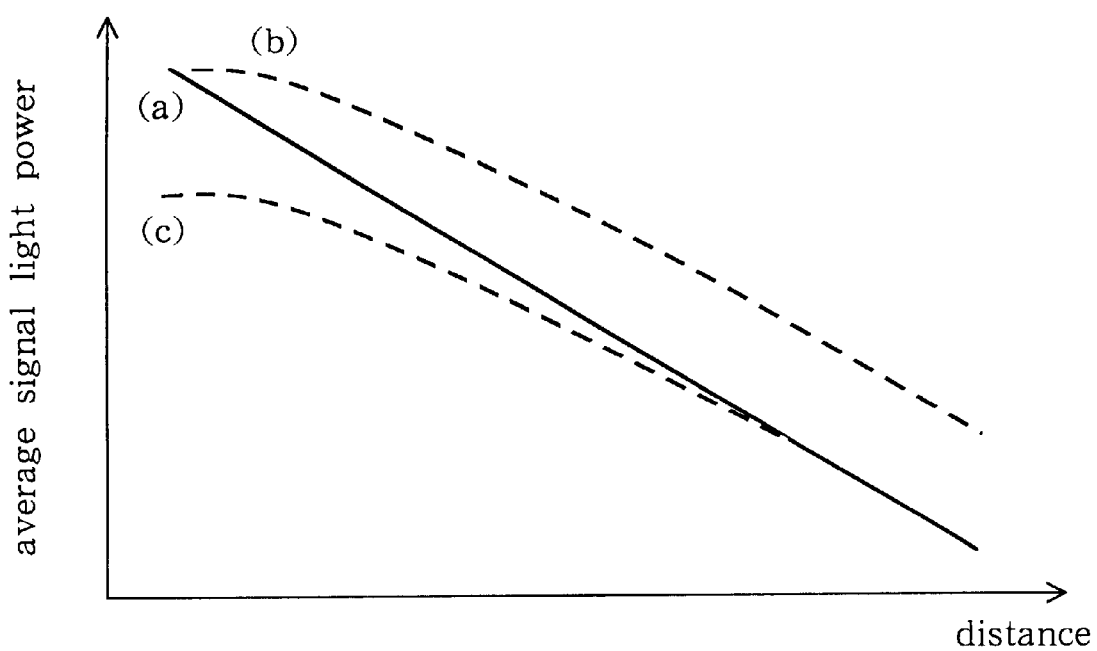
FIG. 13 shows how the signal quality improved by means of forward pumping.

The fourth embodiment of this invention will now be described with reference to FIG. 12. For this embodiment, N of the configuration of the third embodiment connections in series (N is an integer 2 or above). For the fourth embodiment, at any part of the optical fibers 11 through 1N, wavelengths of pumping lights and pumping light power or both are set so the power of lightwaves of $$\text{wavelength } \lambda FWM=\lambda 3\times\lambda 2\times\lambda 1/(\lambda 2\times\lambda 1-\lambda 3\times\lambda 2+\lambda 3\times\lambda 1)$$

arising through FWM of pumping light is 20 dB or more smaller than or one part per hundred or less of the power of input signal light 5 with wavelength at $\lambda$ FWM. Resultantly, signal deterioration between the input signal light 5 and the lightwaves arising of $$\text{wavelength } \lambda FWM=\lambda 3\times\lambda 2\times\lambda 1/(\lambda 2\times\lambda 1-\lambda 3\times\lambda 2+\lambda 3\times\lambda 1)$$

through FWM can be suppressed.

In the same manner as the example provided for the third embodiment, pumping lights of peak wavelengths $\lambda 1=1425$ nm, $\lambda 2=1450$ nm and $\lambda 3=1495$ nm are introduced at approximately 250 mW, approximately 100 mW and approximately 100 mW respectively, (here, the wavelength of light arising through FWM of the pumping lights is $\lambda FWM=1539$ nm). For transmitting a signal light through a plurality (N) pans of optical fibers, lightwaves arising through FWM accumulates, in the worst-case, reaching N times. Accordingly, where N is 100 spans (20 dB), the power of lightwaves arising through FWM of pumping lights can be estimated at $$-41+20=-21 \text{ dBm.}$$

Accordingly, where the power of input signal light 5 is −5 dBm per one wavelength channel, the ratio of the power of input signal light 5 and the power of lightwaves arising through that FWM for example, is 16 dB, considerably below 20 dB. Here, there is considerable input signal light degradation through lightwaves arising due to FWM. To avoid this, in accordance with this invention, the power of each pumping light is lowered so that lightwaves through FWM are less generated, or the wavelengths of pumping light are changed so that lightwaves through FWM in a wavelength band of input signal light 5 does not occur, or both of these can be performed. These measures are effective in reducing deterioration.

As described above, according to the present invention, the problem of deterioration in signal quality can be avoided through suppressing the occurrence of lightwaves from FWM in the wavelength band of signal light by appropriately setting the wavelengths or power, or both, of pumping lights used for Raman amplification.

What is claimed is:

1. A Raman amplifier comprising;
   a Raman amplification medium which provides signal lights with gain through the stimulated Raman effect;
   a pumping means for injecting pumping lights of a plurality of wavelengths in this Raman amplification medium; and
   a means for allocating wavelengths of said pumping lights so that in respect of two arbitral pumping lights among the pumping lights of a plurality of wavelengths generated by said pumping means, the peak wavelength $\lambda$min, of pumping light having the shorter wavelength and the peak wavelength $\lambda$max, of pumping light having the longer wavelength are in a relationship to the shortest wavelength of the wavelength band of said signal light, $\lambda$short and the longest wavelength of the wavelength band of said signal light, $\lambda$long, expressed as $$\lambda short > \lambda min \times \lambda max / (2\lambda min - \lambda max)$$

or $$\lambda min \times \lambda max / (2\lambda min - \lambda max) > \lambda long.$$

2. A Raman amplifier comprising;
a Raman amplification medium that provides signal light with gain through the stimulated Raman effect;
a pumping means for injecting pumping lights of a plurality of wavelengths in this Raman amplification medium; and
a means for allocating wavelengths of said pumping lights so that three arbitrary pumping lights from among the pumping lights of a plurality of wavelengths generated by said pumping means, the peak wavelengths of which three pumping lights satisfy the expression $$\lambda min < \lambda mid < \lambda max$$

are in a relationship to the shortest wavelength of the wavelength band of said signal light, $\lambda$short and the longest wavelength of the wavelength band of said signal light, $\lambda$long, expressed as $$\lambda short > \lambda max \times \lambda mid \times \lambda min / (\lambda mid \times \lambda min - \lambda max \times \lambda mid + \lambda max \times \lambda min)$$

or $$\lambda max \times \lambda mid \times \lambda min / (\lambda mid \times \lambda min - \lambda max \times \lambda mid + \lambda max \times \lambda min) > \lambda long.$$

3. A Raman amplifier comprising;
a Raman amplification medium that provides signal light with gain through the stimulated Raman effect;
a pumping means for injecting pumping lights of a plurality of wavelengths in this Raman amplification medium; and
a means for setting or allocating the wavelengths or the power, or both, of said pumping lights, so that the power of lightwaves arising through a nonlinear effect of pumping lights generated by said pumping means, or of pumping lights and said input signal, or both, is, within the wavelength band of said signal light, at all points of said Raman amplification medium, 20 dB or more smaller than or one part per hundred or less of, the power of said signal light.

4. The Raman amplifier according to claim 3 wherein the nonlinear effect is FWM.

5. The Raman amplifier according to claim 1 wherein the Raman amplification medium includes an optical fiber, and wherein the absolute value of the chromatic dispersion of said fiber is equal to or greater than 2 ps/nm/km and is equal to or less than 10 ps/nm/km anywhere within the wavelength band of said signal light.

6. The Raman amplifier according to claim 1 wherein the Raman amplification medium includes an optical fiber, and wherein the zero-dispersion wavelength of said optical fiber is equal to or greater than the peak wavelength of the pumping light having the shortest peak wavelength from among said pumping lights and is equal to or less than the peak wavelength of the pumping light having the longest peak wavelength from among said pumping lights.

7. The Raman amplifier according to claim 1 further comprising a forward pumping means for transmitting at least a portion of pumping light generated by said pumping means, inside said Raman amplification medium in the same direction as said signal light.

8. A pumping apparatus comprising;
a pumping means for injecting pumping lights of a plurality of wavelengths in a Raman amplification medium that provides signal light with gain through the stimulated Raman effect;
a means for allocating wavelengths of said pumping lights so that, in respect of two arbitrary pumping lights among the pumping lights of a plurality of wavelengths generated by said pumping means, the peak wavelength, $\lambda$min, of pumping light having the shorter wavelength and the peak wavelength, $\lambda$max, of pumping light having the longer wavelength are in a relationship to the shortest wavelength of the wavelength band of said signal light, $\lambda$short and the longest wavelength of the wavelength band of said signal light, $\lambda$long, expressed as $$\lambda short > \lambda min \times \lambda max / (2\lambda min - \lambda max)$$

or $$\lambda min \times \lambda max / (2\lambda min - \lambda max) > \lambda long.$$

9. A pumping apparatus comprising;
a pumping means for injecting pumping lights of a plurality of wavelengths in a Raman amplification medium that provides signal light with gain through the stimulated Raman effect;
a means for allocating wavelengths of said pumping lights so that three arbitrary pumping lights from among the pumping lights of a plurality of wavelengths generated by said pumping means, the peak wavelengths of which three pumping lights satisfy the expression $$\lambda min < \lambda mid < \lambda max$$

are in a relationship to the shortest wavelength of the wavelength band of said signal light, $\lambda$short and the longest wavelength of the wavelength band of said signal light, $\lambda$long, expressed as $$\lambda short > \lambda max \times \lambda mid \times \lambda min / (\lambda mid \times \lambda min - \lambda max \times \lambda mid + \lambda max \times \lambda min)$$

or $$\lambda max \times \lambda mid \times \lambda min / (\lambda mid \times \lambda min - \lambda max \times \lambda mid + \lambda max \times \lambda min) > \lambda long.$$

10. A pumping apparatus comprising;
a pumping means for injecting pumping lights of a plurality of wavelengths in the Raman amplification medium that provides signal light with gain through the stimulated Raman effect;
a means for setting or allocating the wavelengths or the power, or both, of said pumping lights, so that the power of light arising through a nonlinear effect of pumping lights generated by said pumping means, or of pumping lights and said input signal, or both, is, within the wavelength band of said signal light, at all points of said Raman amplification medium, 20 dB or more smaller than or one part per hundred or less of, the power of said signal light.

11. The pumping apparatus according to claim 10 wherein the nonlinear effect is FWM.

12. The pumping apparatus according to claim 8 further comprising a forward pumping means whereby at least a portion of pumping light generated by said pumping means is transmitted inside said Raman amplification medium in the same direction as said light signal.

13. A program which, by installation in an information processing system, provides for that information processing system, as functionality for allocating wavelengths of pumping lights applicable for a Raman amplifier comprising a Raman amplification medium that provides signal light with gain through the stimulated Raman effect and a pumping means for injecting pumping lights of a plurality of wavelengths in this Raman amplification medium, or for a pumping apparatus providing a pumping means for injecting pumping lights of a plurality of wavelengths in a Raman amplification medium that provides signal light with gain through the stimulated Raman effect, functionality that realizes allocation of wavelengths of said pumping lights so that in respect of two arbitrary pumping lights among the pumping lights of a plurality of wavelengths generated by said pumping means, the peak wavelength $\lambda$min, of pumping light having the shorter wavelength and the peak wavelength $\lambda$max, of pumping light having the longer wavelength are in a relationship to the shortest wavelength of the wavelength band of said signal light, $\lambda$short and the longest wavelength of the wavelength band of said signal light, $\lambda$long, expressed as $$\lambda short > \lambda min \times \lambda max/(2\lambda min - \lambda max)$$

or $$\lambda min \times \lambda max/(2\lambda min - \lambda max) > \lambda long.$$

14. A program which, by installation in an information processing system, provides for that information processing system, as functionality for allocating wavelengths of pumping lights applicable for a Raman amplifier comprising a Raman amplification medium that provides signal light with gain through the stimulated Raman effect and a pumping means for injecting pumping lights of a plurality of wavelengths in this Raman amplification medium, or for a pumping apparatus providing a pumping means for injecting pumping lights of a plurality of wavelengths in a Raman amplification medium that provides signal light with gain through the stimulated Raman effect, functionality that realizes allocation of wavelengths of said pumping lights so that three arbitrary pumping lights from among the pumping lights of a plurality of wavelengths generated by said pumping means, the peak wavelengths of which three pumping lights satisfy the expression $$\lambda min < \lambda mid < \lambda max$$

are in a relationship to the shortest wavelength of the wavelength band of said signal light, $\lambda$short and the longest wavelength of the wavelength band of said signal light, $\lambda$long, expressed as $$\lambda short > \lambda max \times \lambda mid \times \lambda min/(\lambda mid \times \lambda min - \lambda max \times \lambda mid + \lambda max \times \lambda min)$$

or $$\lambda max \times \lambda mid \times \lambda min/(\lambda mid \times \lambda min - \lambda max \times \lambda mid + \lambda max \times \lambda min) > \lambda long.$$

15. A program which, by installation in an information processing system, provides for that information processing system, as functionality for allocating wavelengths of pumping lights applicable for a Raman amplifier comprising a Raman amplification medium that provides signal light with gain through the stimulated Raman effect and a pumping means for injecting pumping lights of a plurality of wavelengths in this Raman amplification medium, or for a pumping apparatus providing a pumping means for injecting pumping lights of a plurality of wavelengths in a Raman amplification medium that provides signal light with gain through the stimulated Raman effect, functionality that realizes allocation or setting of the wavelengths or power, or both, of said pumping lights, so that the power of light arising through a nonlinear effect of pumping lights generated by said pumping means, or of pumping lights and said signal light, or both, is, within the wavelength band of said signal light, at all points of said Raman amplification medium, 20 dB or more smaller than or one part per hundred or less of, the power of said signal light.

16. The program according to claim 15 wherein the nonlinear effect is FWM.

17. The Raman amplifier according to claim 2 wherein the Raman amplification medium includes an optical fiber, and wherein the absolute value of the chromatic dispersion of said fiber is equal to or greater than 2 ps/nm/km and is equal to or less than 10 ps/nm/km anywhere within the wavelength band of said signal light.

18. The Raman amplifier according to claim 3 wherein the Raman amplification medium includes an optical fiber, and wherein the absolute value of the chromatic dispersion of said fiber is equal to or greater than 2 ps/nm/km and is equal to or less than 10 ps/nm/km anywhere within the wavelength band of said signal light.

19. The Raman amplifier according to claim 2 wherein the Raman amplification medium includes an optical fiber, and wherein the zero-dispersion wavelength of said optical fiber is equal to or greater than the peak wavelength of the pumping light having the shortest peak wavelength from among said pumping lights and is equal to or less than the peak wavelength of the pumping light having the longest peak wavelength from among said pumping lights.

20. The Raman amplifier according to claim 2 wherein the Raman amplification medium includes an optical fiber, and wherein the zero-dispersion wavelength of said optical fiber is equal to or greater than the peak wavelength of the pumping light having the shortest peak wavelength from among said pumping lights and is equal to or less than the peak wavelength of the pumping light having the longest peak wavelength from among said pumping lights.

21. The Raman amplifier according to claim 2 further comprising a forward pumping means for transmitting at least a portion of pumping light generated by said pumping means, inside said Raman amplification medium in the same direction as said signal light.

22. The Raman amplifier according to claim 3 further comprising a forward pumping means for transmitting at least a portion of pumping light generated by said pumping means, inside said Raman amplification medium in the same direction as said signal light.

23. The pumping apparatus according to claim 9 further comprising a forward pumping means whereby at least a portion of pumping light generated by said pumping means is transmitted inside said Raman amplification medium in the same direction as said light signal.

24. The pumping apparatus according to claim 10 further comprising a forward pumping means whereby at least a portion of pumping light generated by said pumping means is transmitted inside said Raman amplification medium in the same direction as said light signal.

25. The pumping apparatus according to claim 11 further comprising a forward pumping means whereby at least a portion of pumping light generated by said pumping means is transmitted inside said Raman amplification medium in the same direction as said light signal.

* * * * *